United States Patent [19]

Robertson

[11] Patent Number: 4,992,666

[45] Date of Patent: Feb. 12, 1991

[54] MEASUREMENT OF CONCENTRICITY OF CORE AND CLADDING PROFILES OF AN OPTICAL FIBER PREFORM USING FLUORESCENCE

[75] Inventor: Stuart C. Robertson, Middlesex, United Kingdom

[73] Assignee: GEC Plessey Telecommunications Limited, England

[21] Appl. No.: 390,095

[22] Filed: Aug. 17, 1989

[30] Foreign Application Priority Data

Aug. 24, 1988 [GB] United Kingdom ............... 8820132

[51] Int. Cl.⁵ ............................................. G01N 21/86
[52] U.S. Cl. .................................. 250/561; 250/461.1
[58] Field of Search .................. 250/227.11, 227.24, 250/560, 561, 458.1, 461.1; 356/73.1; 350/96.1, 96.2, 96.26

[56] References Cited

U.S. PATENT DOCUMENTS

| 4,362,943 | 12/1982 | Presby | 250/459.1 |
| 4,506,947 | 3/1985 | Tatekura | 356/73.1 |
| 4,690,493 | 9/1987 | Khoe | 350/96.1 |
| 4,825,092 | 4/1989 | Mehadji | 250/561 |

Primary Examiner—David C. Nelms
Attorney, Agent, or Firm—Kirschstein, Ottinger, Israel & Schiffmiller

[57] ABSTRACT

Concentricity of a light-transmissive core and its cladding is measured by stimulating U-V fluorescence in the core but not the cladding, independently imaging the core/cladding boundary and the outer surface of the cladding and determining their radial separation for different angular orientations of the core and its axis.

14 Claims, 2 Drawing Sheets

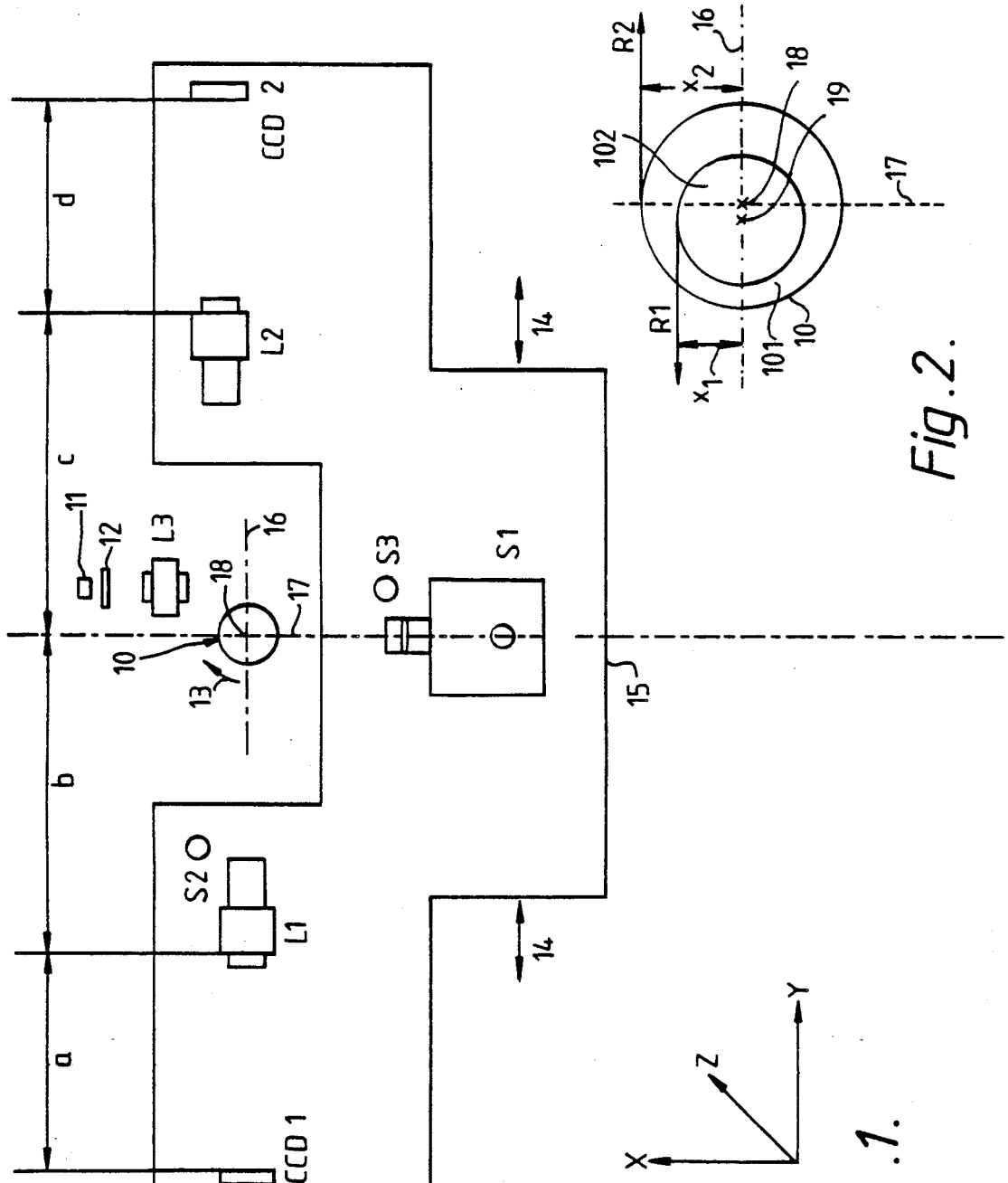

MEASUREMENT OF CONCENTRICITY OF CORE AND CLADDING PROFILES OF AN OPTICAL FIBER PREFORM USING FLUORESCENCE

BACKGROUND OF THE INVENTION

1. Field of the Invention

This invention relates to apparatus for, and a method of, measuring the concentricity of the profiles, in transverse section, of a light-transmissive core and a light-transmissive cladding around the core, and is particularly useful in the quality control of optical fibre preform manufacture.

2. Description of Related Art

The measurement of the core reference circle centre to cladding reference circle centre on a fibre preform is important both for production control and to prevent the pulling of fibre which is out of the required specification. Existing methods are excessively slow and require of operator intervention.

SUMMARY OF THE INVENTION

It is an object of the invention to provide a measurement technique which is faster and is capable of automation.

Accordingly, the invention provides apparatus for measuring the concentricity of the outer cylindrical profiles of a light-transmissive core and of a light-transmissive cladding around the core, comprising: means for causing the core but not the cladding to fluoresce; means responsive to the fluorescent light emitted from the core to image a section of the core/cladding boundary; means responsive to light directed externally at the outer surface of the cladding adjacent the said section, to image that outer surface; and means for determining from the respective images the relative radial positions of the core/cladding boundary and the cladding outer surface. The term "light" is intended to include invisible radiation. Where the core is doped with a germanium oxide, fluorescence occurs with incident U-V (ultraviolet) light, and it is the resulting blue light emitted by the core alone which may be used to form the image of the core/cladding boundary; visible light may be used independently to image the outer surface of the cladding.

The advantages of using this fluorescence technique are that it firstly does not require any index matching oil baths and can therefore be incorporated in a contactless system. Secondly it is a direct imaging method, so that the information is available for direct detection without the need for any mathematical transforms such as are required for example in a refractive index profiler. This makes the method potentially very fast and capable of operating at a measurement time of six preforms per hour.

In another aspect, the invention provides a method of measuring the concentricity of the outer cylindrical profiles of a light-transmissive core and of a light-transmissive cladding around the core, comprising the steps of directing radiation at the core such that the core and not its cladding fluoresces; imaging a section of the core/cladding boundary using the fluorescence radiated from the core; independently imaging the outer surface of a portion of the cladding adjacent the said section of the core/cladding boundary; and determining, from the relative positions of the core/cladding boundary and the outer cladding surface in their respective images, their radial separation.

BRIEF DESCRIPTION OF THE DRAWINGS

In order that the invention may be better understood, one way of performing it will now be described, by way of example only, with reference to the accompanying schematic drawings, in which:

FIG. 1 is a plan view of measurement apparatus together with a cross-sectional view of an optical fibre preform undergoing concentricity measurement;

FIG. 2 is an enlarged cross-sectional view of the preform of FIG. 1, showing the core and its cladding.

DETAILED DESCRIPTION OF THE PREFERRED EMBODIMENTS

Figure 3:
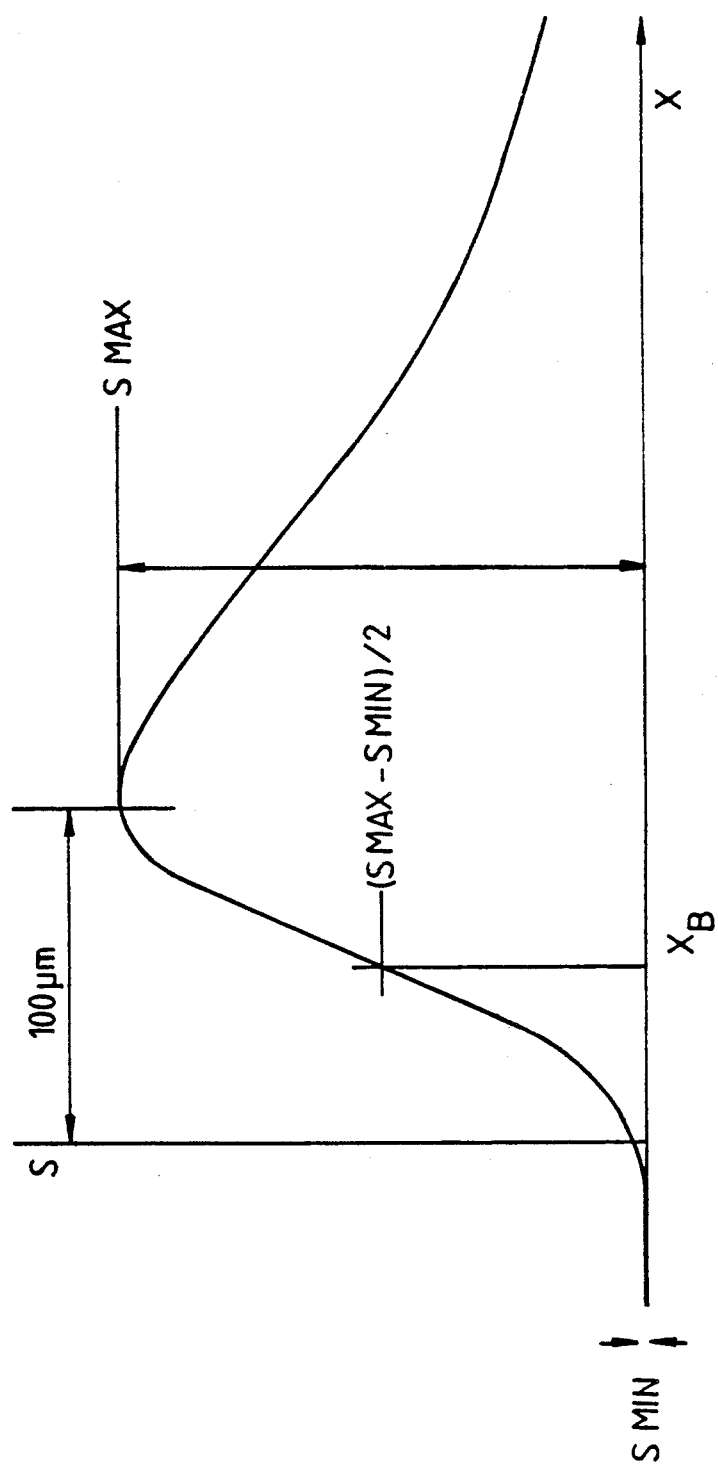
FIG. 3 is a graph of the variation of fluorescent light image intensity along the X-axis of FIG. 1 i.e. along a radius of the fibre preform, in the region of the core/cladding boundary.

A fibre preform 10 has a light-transmissive cylindrical core 102 with an axis 19, doped with a germanium oxide which may be the oxide or the dioxide or a mixture of both, and coated with a light-transmissive tubular cladding 101 with an axis 18 which, in general, will differ from the core axis 19. The separation of these two axes 18, 19 is the measure of their departure from true concentricity. The core 102 fluoresces, emitting light of wavelengths around 420 nm when stimulated by U-V light of wavelengths around 350 nm or shorter. The cladding is transparent to this U-V light and does not fluoresce.

With reference to FIG. 1, the measurement apparatus comprises a horizontal platform 15 which is free to translate in a horizontal direction 14, the Y axis, for auto-focus under the control of a motor (not shown) operated by means of a servo system (not shown) to be described below. The preform 10 extends vertically, along the Z axis, at the centre of the platform 15, and transport mechanisms (not shown) cause controlled intermittent rotation (arrow 13) of the preform about the axis 18 of the cladding and periodic feeding of the preform axially, i.e. in the Z direction, through the measurement apparatus.

The platform 15 supports a U-V source S1, e.g. a 50W mercury discharge lamp; a 1:1 macro lens L1 (e.g. a 100 mm F4 lens with 6 $\mu$m resolution) and a linear CCD array CCD1 (e.g. a 1024 element array 13 mm long) for imaging the blue fluorescence from the core; an identical macro lens L2 and a similar array CCD2 for imaging light of different wavelengths reflected externally in the outer surface of the cladding; a source S2 of either visible or infra-red light for illuminating the cladding; and a collimated source S3 of near IR (infra-red) light for use in the auto-focus system to be described below.

The cylindrical core/cladding boundary is imaged by the macro lens LI which collects rays R1 parallel to the Y axis 16 through the cladding axis 18 and spaced from it by a distance $x_1$ (FIG. 2). The CCD1 filters out light of other wavelengths such as those of the visible light source S2, and forms an image of the core/cladding boundary in the form of a pattern of intensity variation S with the radius X, as shown in FIG. 3. The boundary is imaged as a sharp change of intensity between a minimum $S_{min}$ and a maximum $S_{max}$ over a radial distance of about 100 $\mu$m and the position of the boundary is defined as the value $X_B$ at the half peak intensity $\frac{1}{2}(S_{max}-S_{min})$, on the assumption that the curve has a constant shape.

The cylindrical outer surface of the cladding is imaged at an adjacent region, i.e. on the same diameter 17 on the X axis, by the macro lens L2 which collects rays R2 parallel to the Y axis 16 and spaced from it by a distance $x_2$. The CCD2 filters out the fluorescent blue light from the core, and detects only the light originating from source S2. A sharp edge is apparent in the linear image formed in the CCD2, corresponding to the cladding/air boundary.

In this example, the lens-preform distances b, c are 301 mm and the lens-CCD distances are 97 mm.

Control circuitry (not shown), preferably a microprocessor, responds to the image patterns recorded in the CCD arrays to determine the values $x_1$ and $x_2$, which correspond respectively to the value $X_B$ (FIG. 3) and to the value of X at which a predetermined threshold intensity is reached.

The presence of bow in the preform is compensated for by an autofocus mechanism. The infra-red source S3 directs an IR beam orthogonally to the optic axes R1, R2 of the macro lenses L1 and L2 and transversely of the preform 10, and the source S3 is imaged by a further lens L3, e.g. a 50 mm F1.4 lens, onto an IR filter 12 and single IR photodetector 11 which are fixedly mounted off the platform 15. The preform partially adumbrates the IR image, and the total power passing the preform 10 is measured by the photodetector 11, which is a function of the position along the Y axis 16 of the preform 10, i.e. the extent to which the cladding axis 18 departs from its intended position precisely on the platform axis 17. Conveniently, the apparatus is calibrated to sense 50% IR power when the preform is correctly positioned along the Y axis. Departure from this power value causes a servo system to send an error signal of the appropriate polarity to the platform motor to correct the error by a translation in the Y direction 14. The tracking in this manner should have an accuracy of $\pm 125$ µm.

To obtain a measurement of concentricity at a particular 1 disc of the preform, the values $x_1$ and $x_2$ are determined at of several different angular positions of the preform, and the amount of variation in $(x_2-x_1)$ is found. This is then repeated for successive sectional discs by feeding the preform axially.

I claim:

1. Apparatus for measuring the concentricity of the outer cylindrical profiles of a light-transmissive core and of a light-transmissive cladding around the core of an optical fiber preform, comprising: means for causing the core but not the cladding to fluoresce; means responsive to the fluorescent light emitted from the core to image a section of the core/cladding boundary; means responsive to light directed externally at the outer surface of the cladding adjacent the said section, to image that outer surface; and means for determining from the respective images the relative radial positions of the core/cladding boundary and the cladding outer surface.

2. Apparatus according to claim 1 further comprising means for moving the core and cladding lengthwise relative to the imaging means to effect the concentricity measurement at different axial regions.

3. Apparatus according to claim 1, further comprising means for rotating the core and cladding about the centre axis of the outer cladding surface, to effect the concentricity measurement by determining the said relative radial positions at each of several angularly-spaced sections of the core/cladding boundary.

4. Apparatus according to claim 1, wherein the fluorescent light imaging means comprises a sensor responsive to wavelengths of that fluorescent light but not the light directed externally in the outer surface of the cladding.

5. Apparatus according to claim 1, wherein the directed light imaging means comprises a sensor which ignores light of the wavelengths of the fluorescent light.

6. Apparatus according to claim 1, wherein the radial position-determining means comprises means for detecting in each respective image the position of a predetermined threshold in the light intensity variation which threshold corresponds to the boundary whose radial position is to be determined.

7. Apparatus according to claim 6, wherein each imaging means comprises a linear array of photodetectors responsive to light intensity along a radius of the respective object.

8. Apparatus according to claim 1, wherein the imaging means receive the image-bearing light on optic axes generally transverse to the core axis.

9. Apparatus according to claim 8, wherein the optic axes for both imaging means are parallel.

10. Apparatus according to claim 1, wherein the means for causing fluorescence comprises a source of U-V light directed generally transversely onto the outer surface of the core.

11. Apparatus according to claim 1 further comprising means for maintaining the core or the cladding at a predetermined radial position relative to the imaging means.

12. Apparatus according to claim 1 further comprising means for maintaining the core at a predetermined radial position relative to the imaging means.

13. Apparatus according to claim 9, further comprising means for maintaining the core or the cladding at a predetermined radial position relative to the imaging means, wherein the radial position-maintaining means comprises a servo system responsive to the position of the cladding relative to the imaging means in a radial direction generally normal to the said optic axes actively to correct that relative position.

14. A method of measuring the concentricity of the outer cylindrical profiles of a light-transmissive core and of a light-transmissive cladding around the core of an optical fibre preform, comprising the steps of: directing radition at the core such that the core and not its cladding fluoresces; imaging a section of the core/cladding boundary using the fluorescence radiated from the core; independently imaging the outer surface of a portion of the cladding adjacent the said section of the core/cladding boundary; and determining, from the relative positions of the core/cladding boundary and the outer cladding surface in their respective images, their radial separation.

* * * * *